(12) United States Patent
Stindl et al.

(10) Patent No.: US 12,358,040 B2
(45) Date of Patent: Jul. 15, 2025

(54) DEVICE AND METHOD FOR FEEDING CROSS WIRES IN A WIRE MESH WELDING MACHINE

(71) Applicant: EVG ENTWICKLUNGS—U. VERWERTUNGS-GESELLSCHAFT M.B.H., Raaba (AT)

(72) Inventors: Johann Stindl, Wildon (AT); Georg Droschl, Kitzeck (AT)

(73) Assignee: EVG ENTWICKLUNGS—U. VERWERTUNGS-GESELLSCHAFT M.B.H., Raaba (AT)

( * ) Notice: Subject to any disclaimer, the term of this patent is extended or adjusted under 35 U.S.C. 154(b) by 108 days.

(21) Appl. No.: 18/000,001

(22) PCT Filed: Apr. 28, 2021

(86) PCT No.: PCT/IB2021/053534
§ 371 (c)(1),
(2) Date: Nov. 28, 2022

(87) PCT Pub. No.: WO2021/255535
PCT Pub. Date: Dec. 23, 2021

(65) Prior Publication Data
US 2023/0241666 A1 Aug. 3, 2023

(30) Foreign Application Priority Data

Jun. 17, 2020 (AT) .............................. A 00137/2020

(51) Int. Cl.
*B21F 23/00* (2006.01)
*B21F 27/10* (2006.01)
(52) U.S. Cl.
CPC ............ *B21F 23/005* (2013.01); *B21F 27/10* (2013.01)

(58) Field of Classification Search
CPC ........ B21F 23/00; B21F 23/005; B21F 27/10; B21F 29/00; B21F 27/08; B21F 29/02
See application file for complete search history.

(56) References Cited

U.S. PATENT DOCUMENTS

| 4,116,244 A * | 9/1978 | Ritter ...................... B21F 27/10 |
| | | 219/56 |
| 4,853,511 A | 8/1989 | Ritter et al. |
| 2009/0007621 A1* | 1/2009 | Del Fabro ............. B21F 23/005 |
| | | 72/428 |

FOREIGN PATENT DOCUMENTS

| DE | 2622167 | 12/1977 |
| EP | 0378617 | 9/1993 |
| EP | 1368145 | 12/2003 |

OTHER PUBLICATIONS

International Search Report from corresponding PCT Appln. No. PCT/IB2021/053534, dated Sep. 7, 2021. English translation attached.

* cited by examiner

*Primary Examiner* — Teresa M Ekiert
(74) *Attorney, Agent, or Firm* — Grossman, Tucker, Perreault & Pfleger, PLLC

(57) ABSTRACT

A device for feeding transverse wires above and below a production line for mesh mats which consist of welded transverse and longitudinal wires, said device comprising an upper transverse wire feeder, which has a guide channel and which is arranged in a first position, in which transverse wires are fed along the guide channel of the production line, and comprising a lower transverse wire feeder, by means of which transverse wires can be conveyed from below to the production line, wherein a lower transverse wire store is provided, from which transverse wires can be removed by the lower transverse wire feeder, and wherein the upper transverse wire feeder is designed as a transverse wire switch, which can be pivoted at least into a second position, (Continued)

wherein the lower transverse wire store can be loaded with transverse wired by the transverse wire switch in the second position.

8 Claims, 3 Drawing Sheets

DEVICE AND METHOD FOR FEEDING CROSS WIRES IN A WIRE MESH WELDING MACHINE

FIELD

The invention relates to a device for feeding cross wires above and below a production line for mesh mats, which consist of welded cross and longitudinal wires, comprising an upper cross-wire feeder, which has a guide channel and which is arranged in a first position, in which cross wires are fed along the guide channel of the production line, as well as comprising a lower cross-wire feeder, through which cross wires can be conveyed to the production line from below. The invention further relates to a method for feeding cross wires to a production line for mesh mats with upper and lower cross wires, which can be welded to a set of longitudinal wires, with the repeating sequence of steps: (i) removal of a cross wire from a magazine in a guide channel of an upper cross-wire feeder arranged above the production line; (ii) feeding of the cross wire from step (i) to the set of longitudinal wires, then removal of a cross wire from a cross-wire storage device also arranged underneath the production line, then feeding of the cross wire from the previous step to a set of longitudinal wires.

BACKGROUND

In order to prevent unwanted access to property, company premises and private properties are restricted. This can be done in different ways, but a restriction with fences made of steel wire consisting of fence mats has proven to be the most economical.

The different variants of the fence mats can be designed in such a way that cross wires are exactly above or below the longitudinal wire, cross wire/cross wires are offset lengthwise above or below, pairs of longitudinal wires are arranged above and pairs of cross wires are arranged below the longitudinal wire, and fence mats are welded to cross wires above or cross wires only below the longitudinal wires.

With a sequence of fence mats with cross wires above the longitudinal wires and with cross wires below the longitudinal wires, the stack height can be reduced by approximately half.

The prior art is that the fence mats, the "double-rod fence mat" for example, are produced with double rods lying transversely to the production direction, i.e. one cross wire is above and one cross wire is below the longitudinal wire. The exactly opposite cross wires which are to be welded with the double-rod fence mat are welded in the same position in the welding machine during the production of the fence mat. For smaller quantities, the prior art is also that the fence mats are produced from pre-cut longitudinal wires.

One problem with the prior art is that, due to the fence mat configuration, significantly more longitudinal wires are welded than cross wires, and this can result in downtimes between the production of the individual fence mats. For example, with a standard double-rod fence mat with a dimension of 3×2 m, the time ratio between the longitudinal wire preparation and the production of the fence mat can be up to 2:1.

The pre-cut cross wires required for production have so far been supplied to the welding machine from a cross-wire magazine, which is separated from a cross-wire bundle or fed by an inline wire straightening system.

In order to be able to manufacture these double-rod fence mats or even fence mesh mats with cross wire above or below the longitudinal wire, nowadays two cross-wire magazines are arranged with one magazine above the production line and one magazine below or below and to the side of the production line.

The disadvantage of the variant with the cross-wire magazine below the production line is the filling, maintenance, and troubleshooting of the cross-wire separation or cross wire supply.

The disadvantage of the variant with the cross-wire magazine below and to the side of the production line is the additional space required and the need for an additional device for transport to the welding line. In order to ensure production at an appropriate speed and position accuracy, the system must be equipped with complex electrical drive technology. Another disadvantage is that, when the cross-wire diameter and cross-wire length changes, two cross-wire magazines always have to be retrofitted. In summary, the disadvantages of the cross-wire variants mentioned above are the investment, maintenance, and setup costs.

SUMMARY

The aim of the invention is then to avoid the disadvantages mentioned above. The device according to the invention achieves this in that a lower cross-wire storage device is provided, from which cross wires can be removed through the lower cross-wire feeder, and in that the upper cross-wire feeder is designed as a cross-wire switch which can be pivoted into at least one second position, wherein, in the second position, the lower cross-wire storage device can be supplied with cross wires by means of the cross-wire switch.

The method according to the invention overcomes the disadvantages of the prior art in that the following steps take place after step (ii) and before the subsequent step:
  (iii) removal of a further cross wire from a magazine and placement in the guide channel of the upper cross-wire feeder and pivoting of the cross-wire feeder, which is designed as a cross-wire switch, into a second position;
  iv) feeding of the cross wire from step (iii) into a park position of the lower cross-wire storage device;
  (v) pivoting of the cross-wire switch back into the first position.

Further features of the system according to the invention and of the method can be found in the dependent claims.

BRIEF DESCRIPTION OF THE DRAWINGS

The invention is explained in more detail in the following by means of an exemplary embodiment shown in the drawings. The following is shown.

DETAILED DESCRIPTION

Figure 1:
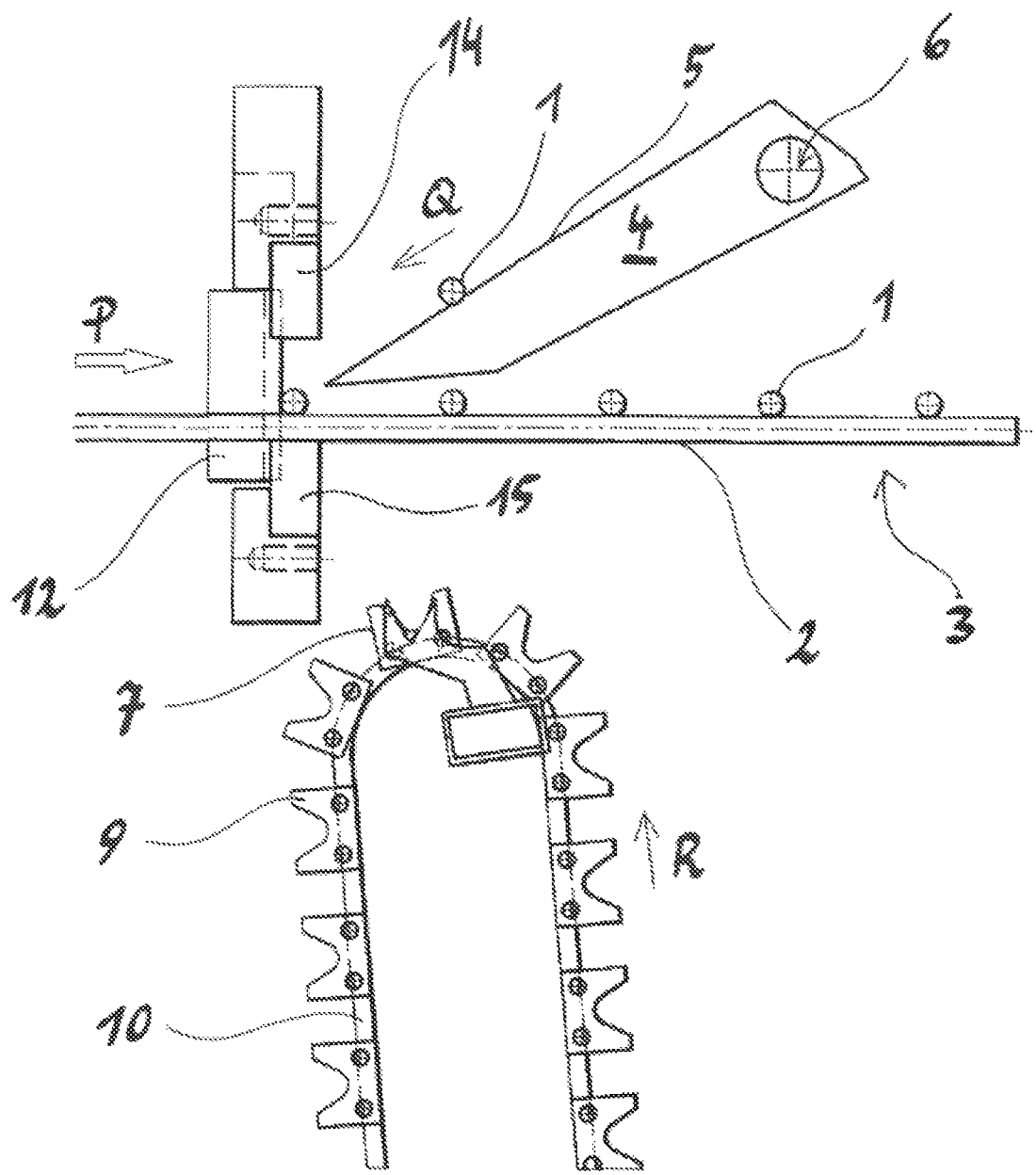
FIGS. 1 and 3 each show a schematic side view of the device.

According to FIG. 1, an element such as a double-rod fence mat is produced in the form of a wire mesh mat 3 by welding upper and lower cross wires 1 to a set of longitudinal wires 2. The set of longitudinal wires 2 (only one longitudinal wire 2 can be seen in a side view in FIGS. 1 and 3) lies in a production line and is advanced cyclically along the production direction P. The supplied cross wires 1 come to rest on the cross-wire stop 12 and are welded to the longitudinal wires by means of upper electrodes 14 and lower electrodes 15 according to the electrical resistance method.

For the cyclic cross-wire feed, an overhead cross-wire magazine (not shown) is equipped with a wire switch 4 so that a cross-wire storage device 8—or a cross-wire magazine—can be filled below the production line during a downtime in mat production. The downtime, which is still problematic in the prior art, is advantageously used by the invention.

The cross-wire switch 4 is designed such that a guide channel 5 can be pivoted in two predefined positions (more positions are also possible). As shown in FIG. 1, the first position is used to feed a cross wire 1 above the production line directly into the production or welding line. In the second position of the guide channel 5 (see FIG. 2), the cross-wire storage device 8—or the lower cross wire magazine—can be filled underneath the production line. In the simplest case according to FIGS. 1 to 3, the guide channel 5 is the track on the arm of the cross-wire switch 4, in which a cross wire 1 is guided to the predetermined location along direction Q. In the first position, the outlet of the guide channel 5 is the predetermined location for the welding of an upper cross wire 1 on the cross-wire stop 12; and, in the second position, it is a park position in a carriage 9 of the lower cross-wire storage device 7. The upper and lower cross-wire feeders are constructed such that they can place the cross wires at the same position (opposite the longitudinal wires 2), as viewed in the direction of flow.

The cross-wire switch 4 is mounted on a pivot pin, which lies in an axis 6 about which the cross-wire switch 4 can rotate between the at least two positions. The axis 6 extends parallel to the longitudinal axes of the cross wires 1 to be processed. It should be noted only during the design of the device that the cross-wire switch 4 can be pivoted freely between other elements of the device as well as a wire mesh mat in production.

The cross-wire storage device 8, which is positioned underneath the production line, is designed such that a sufficient number of cross wires can be picked up individually and, if necessary, cycled further and delivered to a lower cross-wire feeder 7. Since it is appropriate to design the production line horizontally as relates to the force of gravity, the regions "above" and "below" the production line, which are also arranged along the direction of gravitational force, are thereby defined.

Figure 2:
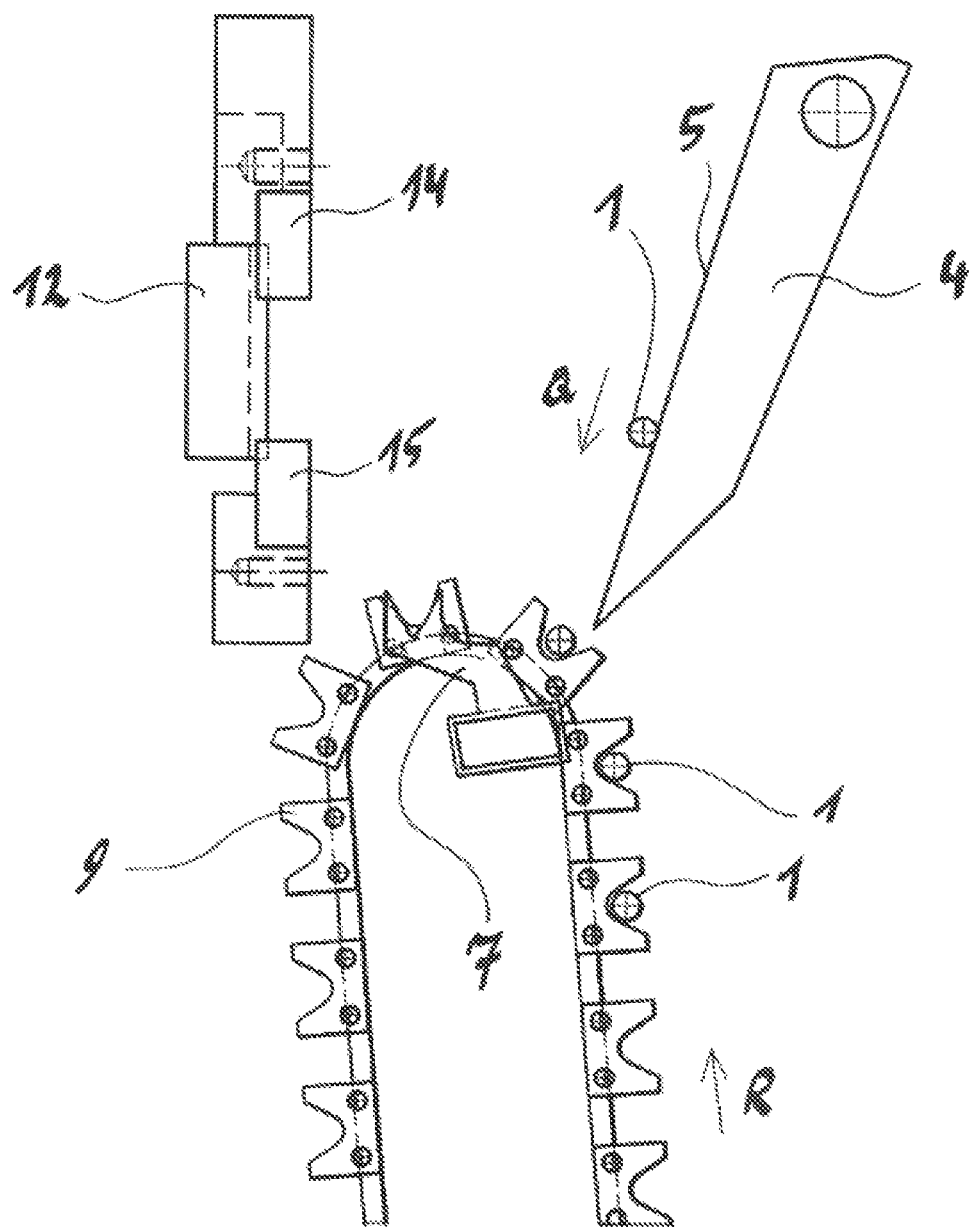
FIG. 2 shows a schematic side view with the mesh mat omitted.

According to FIG. 2, the lower cross-wire storage device 8 consists of a group of wire pickup elements (e.g. carriage 9), which are arranged on a continuous transport chain 10 and can be moved cyclically in direction R. The storage device volume of the lower cross-wire storage device 8 can be dimensioned smaller or bigger and thereby assist in adjusting production and operating costs; of the park positions for cross wires 1, anywhere from a few up to about 100 can actually be occupied with cross wires 1 in ongoing operation.

The cross-wire feeder 7 positioned under the production line is used for feeding the cross wire 1 into the welding line and can be designed very simply due to the short travel paths. According to FIG. 3, the length of the travel path is only constrained by the minimum distance of a position of a wire pickup element, with a cross wire 1 to be transported, up to the welding location underneath the production line. In the simplest case, the cross-wire feeder 7 is a fork which lifts the cross wire 1 out of a wire pickup element designed as a carriage 9, using the force of gravity and optionally a simple stopping means, and presses it onto the longitudinal wires 2 from below. This short travel path also enables a very dynamic mode of operation with short cycle times.

Figure 3:
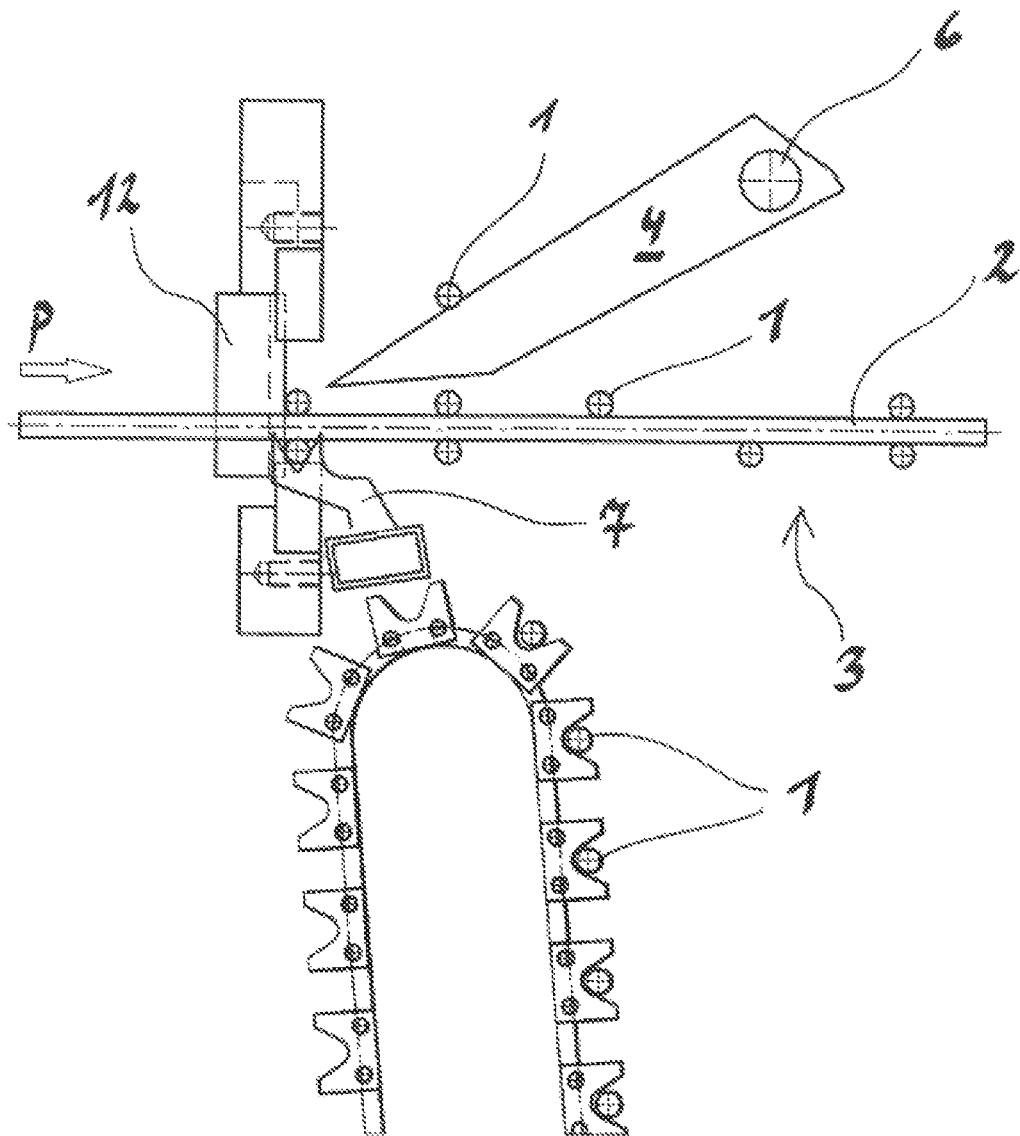

According to previous automated wire mesh welding methods, a preprepared set of longitudinal wires 2, as shown in FIGS. 1 and 3, is advanced cyclically in the production direction P. An upper and a lower feeder place two cross wires 1 opposite the longitudinal wires 2 into a position in which they are welded. Previously, the feeders have removed the cross wires 1 from cross-wire magazines. Among the repeating steps for production, e.g. of a double-rod fence mat, there are then the steps of pivoting the upper feeder, in the form of a cross-wire switch 4, into a second position for filling the lower, compactly designed cross-wire storage device 8 and the transfer of one or several cross wires into said cross-wire storage device 8. Subsequently, the cross-wire switch 4 pivots back into its first position in order to supply the next cross wire 1 to the production line from above. The invention makes use of the aforementioned unavoidable downtimes of the machine between the production of successive mats or between the welding elements: This means that the time which is required for production is also available for filling the lower cross-wire storage device 8 (or the wire magazine).

In one variant, the upper cross-wire switch 4 could transfer a cross wire 1 directly to the lower cross-wire feeder 7. A lower cross-wire storage device 8 can then be omitted entirely; this decreases the disadvantage that there is no longer any buffer stock at the lower cross wires 1. This would be possible, for example, during welding of the first pair of cross wires of a mat if the longitudinal wires do not yet extend into the travel path of the cross-wire switch 4.

In a further variant, the loading capacity of the lower cross-wire storage device 8 is large enough that the number of cross wires 1 for a complete mesh mat can be held therein. Thus, the lower cross-wire storage device 8 could be filled in the section of time between the production of two successive mesh mats. The advantage of the invention is also achieved when the lower cross-wire storage device holds the number cross wires 1 for an entire stack of mats and is filled once before the start of production for this purpose.

In a further alternative, the lower cross-wire storage device 8 moved out from the side in order to be supplied with cross wires 1 next to the production line or next to a mesh mat in production. One skilled in the art would then choose established means in order to also deflect the cross-wire switch 4 from the side accordingly.

A further advantage of the method is the programming of the cyclically repeating sequence of steps for the production of mesh mats together also with the supplying of the lower cross-wire storage device 8 by means of the cross-wire switch 4 within the scope of the electronic controller already being used. The coordinated method steps can furthermore be embedded in an environment with the change of the cross-wire material.

What is claimed is:

1. A device for feeding cross wires above and below a production line for mesh mats, which consist of welded cross and longitudinal wires, comprising:
   an upper cross-wire feeder, which has a guide channel and is arranged in a first position, in which cross wires are fed along the guide channel to the production line,
   a lower cross-wire feeder, through which the cross wires can be conveyed to the production line from below, and
   a lower cross-wire storage device, from which cross wires can be removed through the lower cross-wire feeder, and wherein, the upper cross-wire feeder is designed as a cross-wire switch which can be pivoted into at least one second position, wherein, in the second position, the lower cross-wire storage device can be supplied with cross wires by means of the cross-wire switch.

2. The device according to claim 1, wherein the cross-wire switch is an arm which can be pivoted between the first and the second position over an axis, which is parallel to the axis of processed cross wires.

3. The device according to claim 1, wherein, in the second position, the outlet of the guide channel of the cross-wire switch lies in a park position for cross wires of the lower cross-wire storage device.

4. The device according to claim 1, wherein the lower cross-wire storage device comprises wire pickup elements for picking up cross wires which are arranged on a continuous transport chain.

5. The device according to claim 1, wherein the lower cross-wire feeder comprises at least one fork, by means of which a separated cross wire can be lifted to the production line.

6. The device according to claim 1, wherein the cross-wire switch is connected to a magazine for cross wires such that the separated cross wires can be picked up in the guide channel thereof.

7. A method for feeding cross wires to a production line for mesh mats with upper and lower cross wires, which can be welded to a set of longitudinal wires, with the repeating sequence of steps, comprising:

(i) removing an upper supplied cross wire from a magazine in a guide channel of an upper cross-wire feeder, said upper cross-wire feeder being arranged in a first position above the production line;

(ii) feeding the upper supplied cross wire from step (i) to the set of longitudinal wires;

(iii) removing a lower supplied cross wire from a cross-wire storage device arranged underneath the production line using a lower cross-wire feeder also arranged underneath the production line, wherein at least one cross wire is supplied to the lower cross-wire storage device by the following steps:

(a) removing the at least one cross wire from the magazine, placing the at least one cross wire in the guide channel of the upper cross-wire feeder, and pivoting the upper cross-wire feeder from the first position into a second position;

(b) feeding the at least one cross wire from (a) into a park position of the cross-wire storage device; and (c) pivoting the upper cross-wire feeder back into the first position; and (iv) feeding the lower supplied cross wire from step (iii) to the set of longitudinal wires.

8. A method for feeding cross wires to a production line for mesh mats according to claim 7, further comprising:

cyclic advancing of the set of longitudinal wires in the production line; and welding of a pair of upper and lower supplied cross wires to the set of longitudinal wires.

* * * * *